United States Patent [19]
Ito et al.

[11] Patent Number: 5,261,082
[45] Date of Patent: Nov. 9, 1993

[54] SEMICONDUCTOR INTEGRATED CIRCUIT HAVING A PLURALITY OF OSCILLATION CIRCUITS

[75] Inventors: Takashi Ito, Kokubunji; Kenichi Ishibashi, Tachikawa; Kenzo Funatsu, Musashimurayama; Naoki Yashiki, Kodaira; Katsumi Iwata, Kokubunji, all of Japan

[73] Assignee: Hitachi, Ltd., Tokyo, Japan

[21] Appl. No.: 651,098

[22] Filed: Feb. 4, 1991

Related U.S. Application Data
[63] Continuation of Ser. No. 271,518, Nov. 15, 1988, abandoned.

[30] Foreign Application Priority Data
Nov. 20, 1987 [JP] Japan .................. 62-293796

[51] Int. Cl.$^5$ .............................................. G06F 1/04
[52] U.S. Cl. ........................... 395/550; 364/DIG. 2; 364/934; 364/934.2; 364/934.4; 364/950; 364/950.4; 364/950.5
[58] Field of Search ................. 395/550, 575, 750

[56] References Cited
U.S. PATENT DOCUMENTS
| | | | |
|---|---|---|---|
| 3,941,989 | 3/1976 | McLaughlin et al. | 235/156 |
| 3,980,993 | 9/1976 | Bredart et al. | 364/200 |
| 4,229,699 | 10/1980 | Frissell | 328/63 |
| 4,317,180 | 2/1982 | Lies | 364/707 |
| 4,386,401 | 5/1983 | O'Brien | 364/200 |
| 4,415,984 | 11/1983 | Gryger et al. | 364/900 |
| 4,463,440 | 7/1984 | Nishiura et al. | 364/900 |
| 4,464,584 | 8/1984 | Hentzschel et al. | 307/200 A |
| 4,615,005 | 9/1986 | Maejima et al. | 364/200 |

FOREIGN PATENT DOCUMENTS
| | | |
|---|---|---|
| 0242010 | 10/1987 | European Pat. Off. . |
| 62-0028823 | 2/1987 | Japan . |

Primary Examiner—Kevin A. Kriess
Attorney, Agent, or Firm—Fay, Sharpe, Beall, Fagan, Minnich & McKee

[57] ABSTRACT

Operation of a clock generating circuit is stopped when the oscillation signals to be selectively transmitted to the clock generating circuit via a multiplexer are switched. The oscillation signals are generated by a first oscillation circuit at a relatively high frequency and by a second oscillation circuit which steadily oscillates at a relatively low frequency. The clock generating operation is resumed in synchronization with the switched oscillation signals.

29 Claims, 4 Drawing Sheets

SEMICONDUCTOR INTEGRATED CIRCUIT HAVING A PLURALITY OF OSCILLATION CIRCUITS

This is a continuation of copending application Ser. No. 07/271,518 filed on Nov. 15, 1988, now abandoned.

BACKGROUND OF THE INVENTION

The present invention relates to a semiconductor integrated circuit device, and more specifically to implementing, for example, a time keeping function on a semiconductor integrated circuit device such as a single-chip microcomputer.

In an electronic desk-top calculator comprised of a microcomputer and semiconductor integration circuits, an oscillation circuit using a quartz oscillator produces raw clock signals for operating the system. When such a data processing system is intermittently operated, the oscillation circuit is stopped. This causes the operations of the microprocessor and memory to temporarily stop, thus reducing the consumption of electrical power. To achieve this reduction, a hold function is provided to stop the system clock upon receipt of a control signal from an external unit or an instruction from the microprocessor.

In a semiconductor integrated circuit device such a microcomputer having a real time clock function, the raw clock signals cannot be stopped if the oscillation circuit is utilized for both time keeping and the system clocks. To overcome this limitation a microcomputer which uses a quartz oscillation circuit of 32.768 KHz for timekeeping and a cheaply constructed RC oscillation circuit or an oscillation circuit using a ceramic oscillator for the raw system clock (about 4 MHz) has been proposed. A microcomputer equipped with such two oscillation circuits has been described, for example, in "Hitachi 4-Bit 1-Chip Microcomputer System, MMCS 40 Series, LCD-III, User's Manual", third edition, No. 4, Hitachi, Ltd., June, 1984, pp. 4 and 24-25.

When the raw high frequency oscillation in the microcomputer is stopped during the holding state, the suspended oscillation circuit must be re-energized at least every second to maintain a real time system clock for the timekeeping function. The present inventors found that a relatively long stabilization waiting time before resuming oscillation results in unstable oscillation of the high frequency. This consumes large amounts of electrical power.

The present inventors also studied using a low frequency to form system clocks by switching the output of the oscillation circuit for timekeeping during the halting operation (subactive). In this case, the present inventors found that the basic clock frequencies for timekeeping and for the system clocks do not have an integer number ratio which would exits if the frequencies were 32 KHz and 4 MHz for example; i.e., the oscillation operations are not performed synchronously. When the two clocks are switched (active/subactive), this lack of synchronization causes extremely narrow pulses SP and undesirable wide pulses WP in the system clocks as shown in FIG. 6. This results in erroneous system operation when the clocks are switched.

SUMMARY OF THE INVENTION

An object of the present invention is to provide a semiconductor integrated circuit device which is designed to operate stably and consume reduced amounts of electrical power.

The above and other objects as well as novel features of the present invention will become obvious from the description of the specification and the accompanying drawings.

A representative example of the inventions disclosed in the present application will now be described briefly. In the invention, the raw oscillation output signals are selectively transmitted to a clock generating circuit via a multiplexer. The high frequency oscillation output signals generated by a first oscillation circuit are controlled by predetermined control signals. When the clock generating circuit stops, a second low frequency oscillation circuit used to generate the system clock signals is synchronized with the oscillation output.

These functions are accomplished with a clock switching circuit, a flag which designates which clock is to be used by the clock switching circuit, and a flag which indicates whether the selected clock should be supplied to the system or not. The flags are set according to an interrupt signal or a program instruction. A mode in which all clocks are shut off (hereinafter referred to as stop mode or watch mode) is always entered whenever a transition from an ordinary operation mode (hereinafter referred to as standard operation mode or active mode) to a mode of low power consumption (hereinafter referred to as low-power-consumption mode or subactive mode) or vice versa occurs. The clocks are also switched during these mode transitions.

The above-mentioned means permit the high frequency operation of the oscillation circuit to be stopped and the clock frequency to be switched to a second source. The clock-generating operation is then resumed using the oscillation frequency of the second source after the operation of the high frequency clock generating circuit stops. Even when clock pulses having dissimilar frequencies are switched, there are no undesirable hair-like clock pulses and system operation remains stable.

DESCRIPTION OF THE PREFERRED EMBODIMENTS

Figure 1:
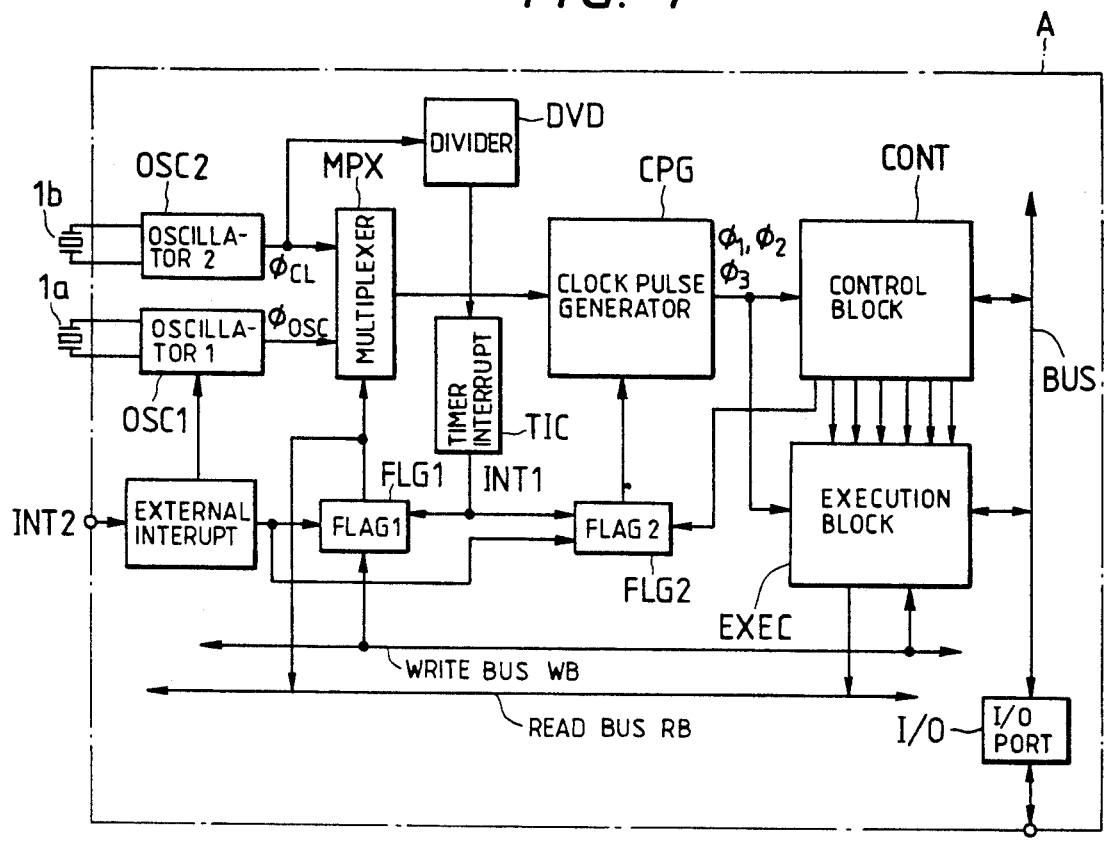
FIG. 1 is a block diagram of an embodiment in which the present invention is adapted to a single-chip microcomputer.

An embodiment in which the invention is adapted to a single-chip microcomputer will now be described in conjunction with FIGS. 1 and 2.

Though not particularly limited, the circuit blocks surrounded by a dashed line A are formed on a single semiconductor chip such as a single crystalline silicon substrate.

The single-chip microcomputer according to this embodiment is equipped with two oscillation circuits, an oscillation circuit $OSC_1$ for generating raw system clock signals, and an oscillation circuit $OSC_2$ for generating raw timekeeping clock signals. The oscillation circuit $OSC_1$ is provided with a ceramic oscillator 1a located externally and the oscillation circuit $OSC_2$ is provided with a quartz oscillator 1b which is also externally located.

The raw oscillation signal $\phi_{OSC}$ is a 4 MHz system clock signal generated by the oscillation circuit $OSC_1$ and the raw oscillation signal $\phi_{CL}$ is a 32.768 KHz timekeeping clock signal generated by the oscillation circuit $OSC_2$. Both $\phi_{OSC}$ and $\phi_{CL}$ are supplied to a multiplexer MPX which selects either one depending upon the state of a flag $FLG_1$. The selected signal is supplied to a clock pulse generating circuit CPG.

The clock pulse generating circuit CPG divides the oscillation signals $\phi_{OSC}$ or $\phi_{CL}$ and processes them to form several kinds of internal clock signals $\phi_1, \phi_2, \phi_3, \ldots$ having suitable frequencies and different phases. The internal clock signals $\phi_1, \phi_2, \phi_3, \ldots$ are supplied to a control block CONT which consists of a ROM that stores programs, a program counter that successively reads instructions from the program ROM, and an instruction decoder. The decoder deciphers the instruction codes to form control signals for the circuits in the microcomputer. These control signals are supplied to an execution block EXEC which consists of various registers, an ALU (arithmetic logic unit), and RAM that serves as a work area. The program counter in the control block CONT and the execution block EXEC are connected to an input/output port I/O via a bus BUS.

In this embodiment a stop flag, $FLG_2$, which is set by a stop instruction is supplied to the clock pulse generating circuit CPG to control an internal gate. When the $FLG_2$ is a logic "1", the oscillation circuit $OSC_1$ ceases to oscillate, and a mode (hereinafter referred to as stop mode or watch mode) is entered into. During this mode, no internal clock signals are supplied to the clock pulse generating circuit CPG and none of the internal clock signals $\phi_1, \phi_2, \phi_3, \ldots$ are generated. The system is thus placed in a stop condition in which no control block CONT operations are performed at all.

To get out of the stop mode (subactive mode), a timer interrupt circuit TIC generates a timer interrupt signal $INT_1$. The TIC receives a signal from a frequency-dividing circuit DVD which divides the frequency of the raw oscillation signal $\phi_{CL}$. The interrupt signal $INT_1$ from the timer interrupt circuit TIC clears the stop flag $FLG_2$ to a logic "0", and also sets the flag $FLG_1$. When the flag $FLG_1$ is set, the multiplexer MPX supplies the clock pulse generating circuit CPG the raw oscillation output signal $\phi_{CL}$ instead of the original raw oscillation output signal $\phi_{OSC}$. The system is then therefore driven by the low frequency internal clock signals formed on the basis of the signal $\phi_{CL}$, and assumes a low-power consumption mode (subactive mode) for carrying out basic timekeeping operations such as addition and the like.

In this embodiment, an external interrupt control circuit EIC is provided to receive an interrupt signal $INT_2$ from the external unit. When the external interrupt signal $INT_2$ is received during the stop mode (watch mode), the oscillation circuit $OSC_1$ resumes oscillation, and the stop flags $FLG_2$ and $FLG_1$ are cleared. When the flag $FLG_1$ is cleared, the multiplexer MPX supplies raw oscillation output signal $\phi_{OSC}$ to the clock pulse generating circuit CPG. The system then assumes the standard operation mode (active mode) in which it is driven at full speed by the high frequency internal clock signals formed by the clock pulse generating circuit CPG.

Figure 2:
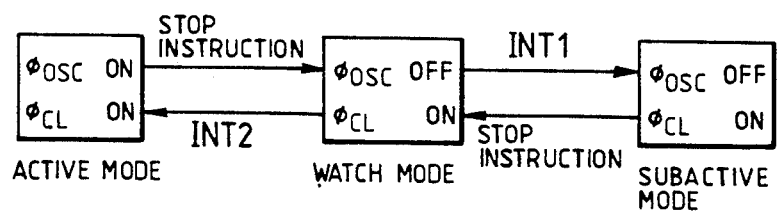
FIG. 2 is a diagram explaining the condition of mode transition in a microcomputer to which the present invention is adapted.

FIG. 2 shows the conditions for mode transition in the above embodiment.

In the above embodiment, a STOP instruction is normally executed at the final stage of ordinary program execution and at the final stage of a timekeeping program execution during the low-power-consumption mode. When the STOP instruction is executed, the system is transferred to the stop mode (watch mode) in which the internal clock signals $\phi_1, \phi_2, \phi_3 \ldots$ are all extinguished. The system gets out of the stop mode (watch mode) in response to an interrupt ($INT_1$ or $INT_2$) and assumes the low-power-consumption mode (subactive mode) or the standard operation mode (active mode) depending upon the content of the flag $FLG_1$.

Therefore, when the system is transferred from the standard operation mode to the low-power-consumption mode or vice versa, the raw oscillation output signal is not suddenly switched from $\phi_{OSC}$ to $\phi_{CL}$ or from $\phi_{CL}$ to $\phi_{OSC}$. Extremely short clock pulses are thus prevented and the system is not erroneously operated.

In the above-mentioned embodiment, the stop mode transitions to the low-power-consumption mode when the timer interrupt $INT_1$ is input prior to the input of interrupt signal $INT_2$ from an external unit.

In the clock switching circuit of the above embodiment, the flag $FLG_1$ is connected to the internal buses WB and RB. The flag $FLG_1$ can thus be set and cleared by instruction. When the STOP instruction is executed, with the content of the flag $FLG_1$ being set in advance, the system is transferred to either a first mode such as the standard operation mode or a second mode such as the low-power-consumption mode when the next interrupt signal is received.

In the above-mentioned embodiment, the oscillation circuit $OSC_1$ is stopped during the stop mode (watch mode) and the low-power-consumption mode (subactive mode). It is, however, also possible to transfer the system from the standard operation mode (active mode) to the low power-consumption mode (subactive mode) or vice versa by controlling the switching of the raw oscillation output signals, the interrupts, and the supply of internal clock signals to the control block, the oscillation circuit $OSC_1$ remains in operation.

In the above-mentioned embodiment, the flags $FLG_1$ and $FLG_2$ may be independently implemented, a bit in the control register, or by any bit in the RAM allotted thereto.

According to the above-mentioned embodiment the microcomputer includes two oscillation circuits of dissimilar oscillation frequencies, a clock switching circuit, a flag that selects the oscillation frequency for use by the clock switching circuit, and a flag which indicates whether the oscillation frequency selected by the clock switching circuit is supplied to the system or not. The flags are set by an interrupt signal or by program instruction. When the system is transferred from the ordinary operation mode (active mode) to the low-power consumption mode (subactive mode) or vice versa, the stop mode (watch mode) is passed through to shut off all internal clock signals $\phi_1$, $\phi_2$, $\phi_3$ . . . , and the raw oscillation output signals are switched during this time. All of the signals $\phi_1$, $\phi_2$, $\phi_3$ . . . are removed at the time of switching to avoid conflict between the clocks. Thus, erroneous system operation is prevented during the transfer from the standard operation mode (active mode) to the low-power-consumption mode (subactive mode) and vice versa. Accordingly, clocks are switched without adversely affecting the operation of the system, and the low-power consumption mode (subactive mode) is realized.

The foregoing described an embodiment of the invention accomplished by the present inventors. The present invention, however, is in no way limited to the above-mentioned embodiment, but can be modified in a variety of other ways without departing from the spirit and scope of the invention. Though the above embodiment dealt with a microcomputer having two oscillation circuits, the invention can also be adapted to generate three or more kinds of clocks. According to the present invention, the mode is controlled by two flags, i.e., a stop flag that is set by a STOP instruction indicating the stop condition of all internal clock signals and a clock designation flag which indicates the raw oscillation output signal to be supplied after the clock stop condition is released, i.e., indicating the mode which the system will assume after the clock stop condition is released. In a system in which the two operational modes are alternatingly repeated, however, the flag for designated the oscillation frequency may be eliminated, and the multiplexer MPX may be switched based on the STOP instruction or the interrupt.

Figure 3:
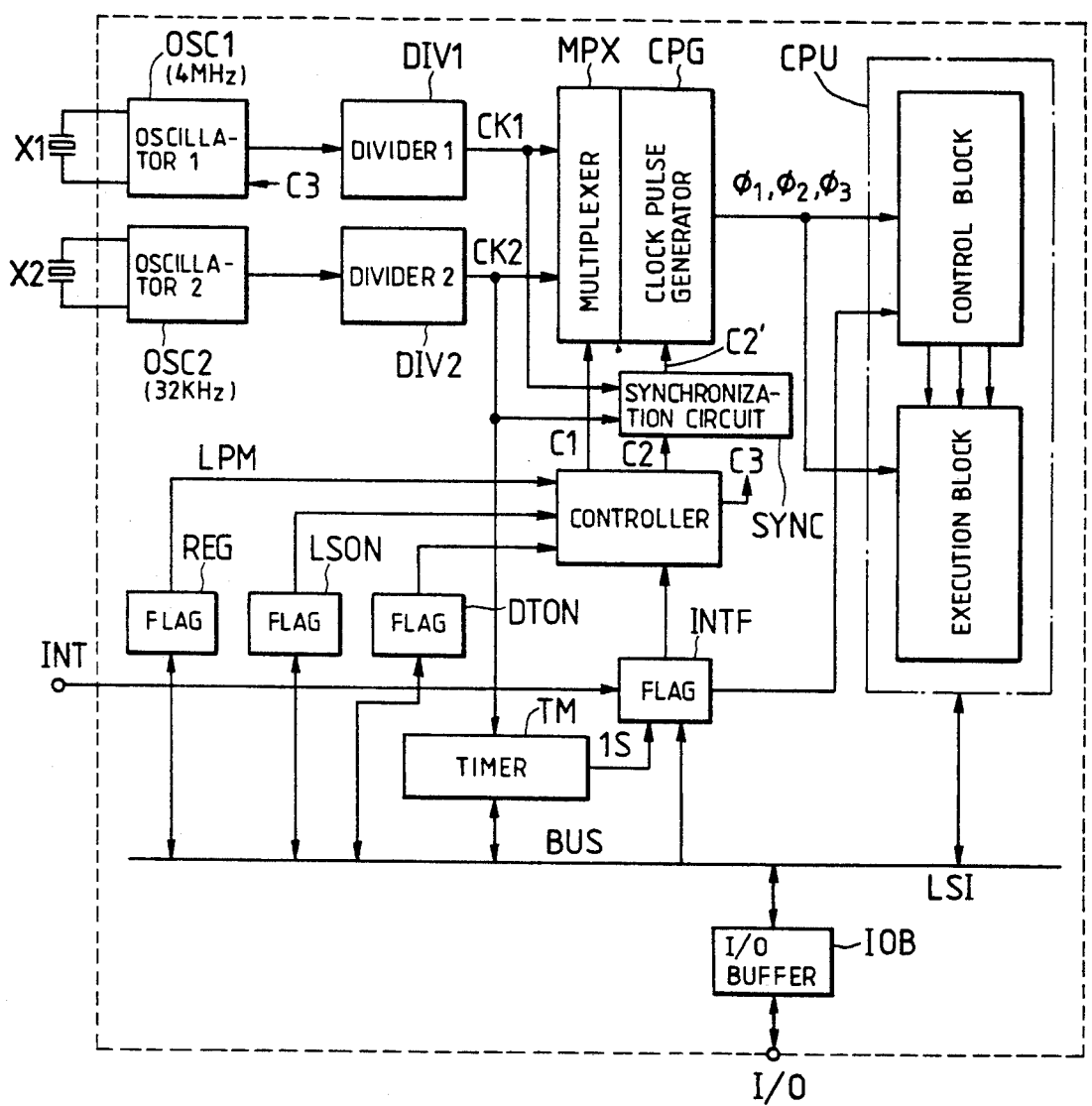
FIG. 3 is a block diagram of another embodiment in which the present invention is adapted to single-chip microcomputer.

FIG. 3 is a block diagram of another embodiment of the present invention adapted to a single-chip microcomputer, wherein the circuit blocks surrounded by a broken line are formed on a semiconductor substrate such as of single crystalline silicon by the widely known technology for fabricating semiconductor integrated circuits.

The microcomputer according to this embodiment is provided with a first oscillation circuit OSC1 for generating raw system clock pulses and a second oscillation circuit OSC2 for producing raw reference time pulses for timekeeping. The first oscillation circuit OSC1 is provided with, for example, an external ceramic oscillator X1 oscillating at a frequency which is relatively high at approximately 4 MHz. To reduce the consumption of electrical power, the oscillation circuit OSC1 is controlled by control signals C3 that will be described later. The second oscillation circuit OSC2 is provided with a quarts oscillator X2 to oscillate at a frequency which is relatively low at approximately 32.765 MHz. The oscillation circuit OSC2 is provided for driving the timekeeping operation and oscillates steadily.

The output signals of the oscillation circuits OSC1 and OSC2 are converted into basic clock pulses CK1 and CK2 through frequency-dividing circuits DIV1 and DIV2 which also shape the waveforms. The basic clock pulses CK1 and CK2 are supplied to the clock pulse generating circuit CPG via the multiplexer MPX which is switched by the control circuit CONTROLLER. The multiplexer MPX selectively transmits the basic clock pulses CK1 or CK2 to the clock pulse generating circuit CPG depending upon the operational mode that will be described later.

The clock pulse generating circuit CPG divides the frequency of the basic clock pulses CK1 and CK2 that are input via the multiplexer MPX and processes them to form a plurality of system clocks $\phi_1$ to $\phi_3$, etc. having different phases.

The system clocks $\phi_1$ to $\phi_3$, etc. are supplied to a control block which consists of a ROM (read-only memory) that stores programs, a program counter that successively reads instructions from the program ROM, and an instruction decoder which deciphers the instruction codes. The instruction decoder outputs the control signals for the circuits in the microcomputer and are supplied to an execution block which consists of various registers, ALU (arithmetic logic operation unit) and RAM (random access memory). The above-mentioned control block and execution block constitute a microcomputer CPU. The program counter in the control block and the execution block are connected via a bus BUS to an input/output port I/O, a timer circuit TM, and various control flags. The internal bus BUS is made of an address bus, a data bus, and a control bus.

The clock pulse generating circuit CPG of this embodiment forms the above-mentioned system clocks $\phi_1$ to $\phi_3$, etc. from the clock pulses CK1 or CK2 when enabled by the control signal C2'. To ensure the system clocks $\phi_1$ to $\phi_3$, etc. are generated in synchronization with the switched basic clock pulses CK1 or CK2, the control signal C2 formed by the controller CONT is passed through the synchronizing circuit SYNC.

The basic clock pulse CK2 for timekeeping is supplied to the timekeeping circuit TM which divides the frequency of the basic clock pulse CK2 to form a time pulse such as a 1-second pulse 1S. The time pulse 1S is supplied to an interrupt flag INTF. The interrupt processing of the time pulse 1S designates timekeeping operation for the control block in the CPU. For example, if an interrupt from the time pulse 1S develops, the control block in the CPU reads the "seconds data" stored in the RAM serving as a work area, adds +1 thereto, and writes it onto the RAM as new "seconds data". If there is a carry, it is added to the "minute data" in the same manner as described above. Likewise, if there is a "minute data" carry, the "hour data", the "day data" or the "week data" is increased. The timekeeping operation is thus realized by responding to the one second interrupt to increment the "second data" and by adding +1 to the other data depending upon the presence of absence of a carry.

The timekeeping operation could be performed with pulses shorter than one second by inputting suitable offset data from the internal buses BUS to the timekeeping circuit TM and generating the time pulse 1S at a period shorter than 1 second.

According to this embodiment, a flag REG is provided that can be set by a STOP instruction. A status signal LPM (low power mode) that represents the content of the stop flag REG is supplied to the CONTROLLER. The signal LPM consists of two bits, i.e., a stop signal STP and a stand-by signal SBY, to produce three statuses consisting of the aforementioned active mode, a watch mode and a subactive mode that will be described later.

Figure 4:
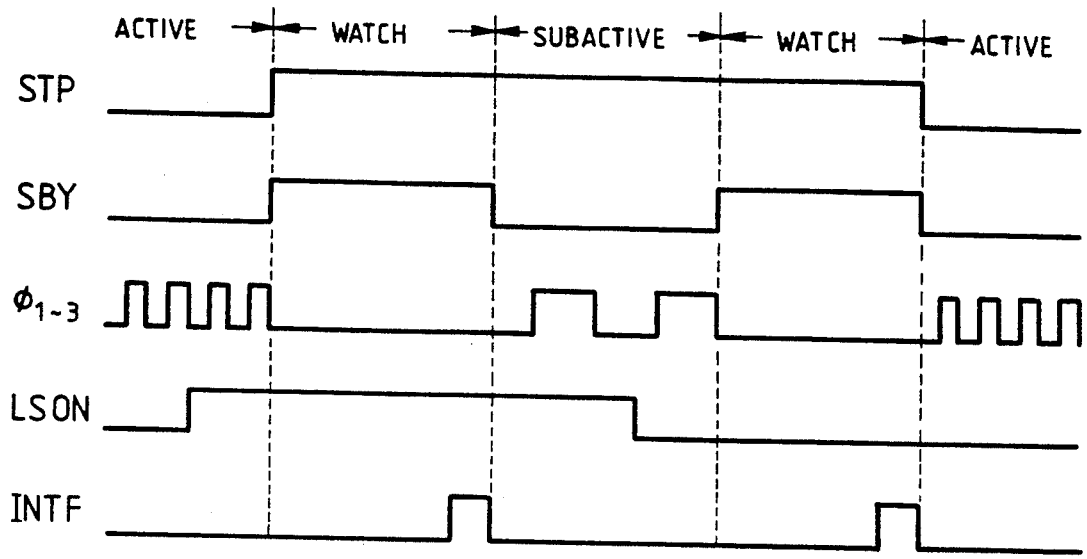
FIG. 4 is a diagram of waveforms for explaining the operation.
Figure 5:
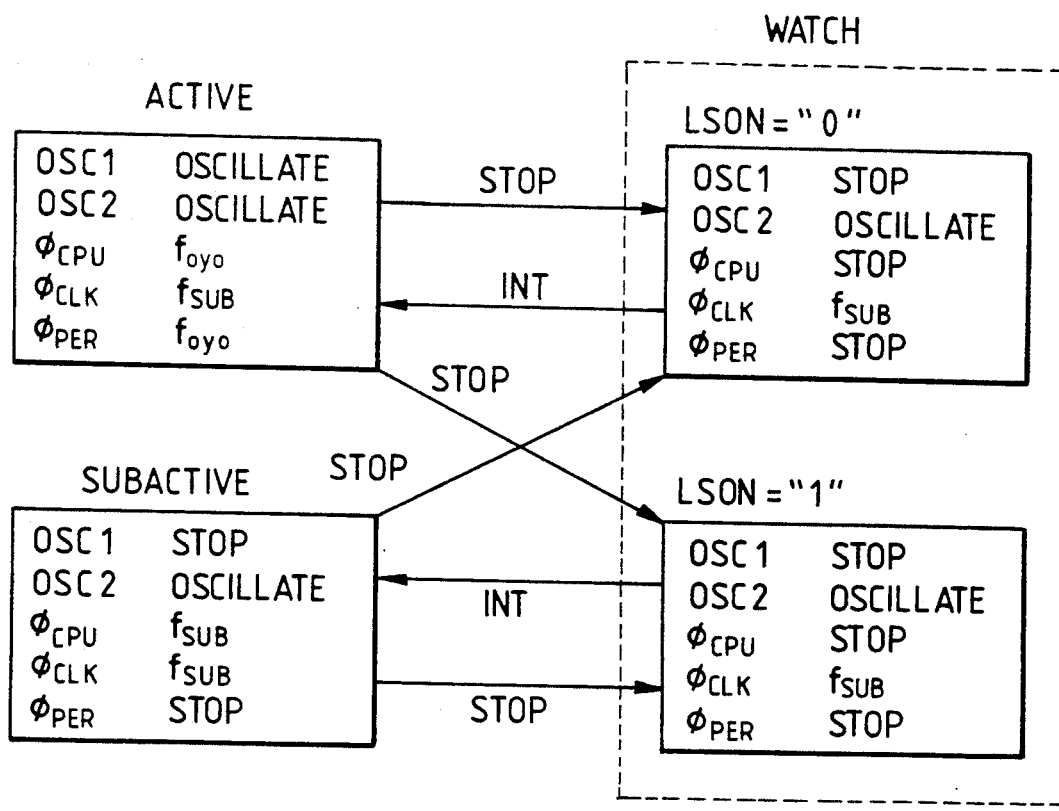
FIG. 5 is a diagram of status transition for explaining the example of the operation; and, FIG. 6 is a diagram of waveforms for explaining the operation for switching the clock pulses that can be taken into consideration prior to the present invention.
Figure 6:
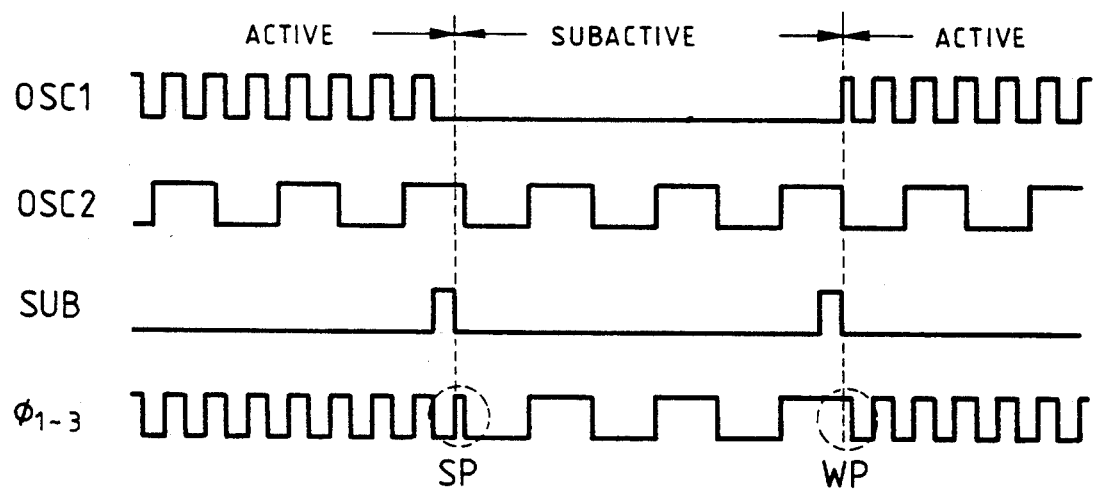

In the active mode, the flag REG (STP and SBY) is cleared as shown in the waveform diagram of FIG. 4 and in the status transition diagrams of FIG. 5. In response to the low level of signals STP and SBY, the control circuit CONT activates the oscillation circuit OSC1 with the control signal C3, and enables the multiplexer MPX to select the basic clock pulse CK1. The clock pulse generating circuit CPG therefore generates system clocks $\phi_{CPU}$ ($\phi_1$ to $\phi_3$, etc.) having a high frequency $f_{OYO}$ corresponding to the basic clock pulses CK1.

During the active mode, if the STOP instruction is executed and the signals STP and SBY are set to the high level relative to the stop flag REG, the CONTROLLER then transitions the system from the active mode to the watch mode. In the watch mode, the oscillation circuit OSC1 and the clock pulse generating circuit CPG stop. Therefore, the system clocks $\phi_{CPU}$ ($\phi_1$ to $\phi_3$, etc.) are not supplied to the CPU. No system clocks $\phi_{CPU}$ or clock pulses $\phi_{PER}$ for peripheral circuits are produced during the watch mode. However the clock pulse $\phi_{CLK}$ that serves as a time base for maintaining the timekeeping function having a low frequency $f_{SUB}$ and based on the basic clock pulse CK2 is produced during the watch mode.

A flag LSON designates the low-speed-on mode. The upper transition diagram of FIG. 5 applies when it is a logic "0", and the lower transition diagram applies when it is a logic "1". As will be described later, this is used to indicate when the system is transferred from the watch mode to an other active mode or subactive mode. For example, when the timekeeping function only is to be carried out, the flag LSON is set to the logic "1" prior to executing the stop instruction STOP.

In the watch mode, the oscillation circuit OSC2 for timekeeping is active and the timekeeping circuit RM receives the signal CK2. The other circuits on the chip assume a low power consumption mode.

When only the timekeeping function is active, the interrupt flag INTF informs the control circuit CONT when a 1-second pulse 1S has been produced from the timekeeping circuit TM and designates the change of mode into the subactive mode. In response thereto, the CONTROLLER switches the multiplexer MPX to select the basic clock pulse CK2. The synchronizing circuit SYNC generates control signal C2' in synchronization with the switched basic clock pulse CK2, so that the clock pulse generating circuit CPG resumes its operation. The clock pulse generating circuit CPG then generates system clocks $\phi_{CPU}$ ($\phi_1$ to $\phi_3$, etc.) for the CPU having a low frequency $f_{SUB}$ based on the basic clock pulse CK2 for timekeeping. In resuming THE operation of the clock pulse generating circuit CPG, the control signal C2' for controlling the logic gate is generated by synchronizing circuit SYNC in synchronism with the clock pulse CK2. No narrow pulses or wide pulses are generated in the system clocks $\phi_{CPU}$ ($\phi_1$ to $\phi_3$, etc.) thus formed by the clock pulse generating circuit CPG.

The interrupt flag, INTF actuates the control block of the microprocessor CPU and maintains the incremental timekeeping operation described above. The system returns to the watch mode upon the execution of the STOP instruction that is inserted in the interrupt processing program at the final state of the timekeeping operation.

As described above, the system clocks $\phi_{CPU}$ are formed by utilizing basic clock pulses CK2 formed by the oscillation circuit OSC$_2$ for the timekeeping function. The high frequency oscillation circuit OSC1 is not operated during this period. Therefore, the current is not wastefully consumed from the start of oscillation until the oscillation is stabilized.

One of three statuses is possible when the system returns to the active mode. When the system is in the watch mode, the flag LSON is set to the logic "1", and upon receiving an interrupt from the external interrupt terminal INT, the flag INTF is set and the system is transferred to the subactive mode in the manner as described above. The interrupt flag INTF informs the execution block of the microprocessor CPU of the fact that the interrupt is due to an external factor, clears the flag LSON to a logic "0" and the interrupt processing in the first stage is finished. Upon execution of the STOP instruction when the interrupt processing is finished, the system transfers to the watch mode (LSON="0") depicted in the upper status transition diagram of FIG. 5. The interrupt flag INTF is started again from the external interrupt terminal INT, so that the active mode is assumed. In this case, the CONTROLLER generates control signals C3 so that the oscillation circuit OSC1 starts to oscillate, and the multiplexer MPX is switched to select the basic clock pulse CK1. After the oscillation OSC1 stabilizes, the clock pulse generating circuit CPG resumes operation in synchronization with the basic clock pulse CK1. Thus, the system clocks $\phi_{CPU}$ ($\phi_1$ to $\phi_3$, etc) supplied to the CPU and the clock pulses $\phi_{PER}$ for peripheral circuits have a high frequency $f_{OYO}$ according to the basic clock pulse CK1.

When the flag DTON is set to the logic "1" the watch mode (LSON="1") is automatically switched to the watch mode (LSON="0") through the subactive mode with one external interrupt application and then returned to the active mode. In other words, when the flag DTON is set to a logic "1", the control circuit CONT automatically executes the operation for switching the clocks as described above.

The remaining status possible is the case when the flag LSON is set to the logic "0" while the system is transferred from the active mode to the watch mode. In this case, the system is transferred to the active mode in response to a single interrupt. This interrupt includes the timer circuit interrupt TM for the timekeeping operation. Switching from the watch mode to the active mode involves starting the oscillation circuit OSC1 as previously described.

A variety of flags for designating the operation of the CONTROLLER are connected to the internal bus BUS such that the content of the flag is set depending upon the instruction executed. By setting the LSON flag before executing the STOP instruction, the system can be transferred, upon input of the next interrupt signal, to a desired mode of operation, either the active mode such as the standard operation mode or the subactive mode which carries out the timekeeping operation only. When the flag DTON is set the watch mode can be automatically assumed from the active mode upon single application of the external interrupt as described earlier.

The functions and effects obtained from the above-mentioned embodiment of FIG. 3 are described below.

(1) Oscillation output signals are selectively transmitted to a clock generating circuit CPG via a multiplexer MPX, the oscillation output signals generated by the first oscillation circuit OSC1 have a relatively high frequency and are controlled according to predetermined control signals. The second oscillation circuit OSC2 steadily oscillates at a relatively low frequency. The clock generating operation is synchronized with the oscillation outputs that are switched via an operation mode which also stops the operation of the clock generating circuit. In this construction, the high frequency oscillation circuit is stopped as required, and the clock generating circuit operation is momentarily stopped when the clock frequency is switched. The clock generating operation then resumes in synchronism with the newly applied oscillation frequency. When clock pulses having dissimilar frequencies are used, undesired erratic clock pulses are not produced, and the frequency switch operation is stably performed.

(2) The second oscillation circuit is used for timekeeping. System clocks $\phi_1, \phi_2, \phi_3 \ldots$ are formed by the timekeeping oscillation pulses in the low-power-consumption mode. The first oscillation circuit OSC1 is not operational during this time. There is no need to start the first oscillation circuit OSC2 to perform a timekeeping operation. This makes it possible to reduce the consumption of electric power that could result if the first oscillation circuit is required to service the timekeeping interrupt.

The present invention is not limited to the above-mentioned embodiments only but can be modified in a variety of other ways without departing from the spirit and scope of the invention. For example, operation of the oscillation circuit OSC1 to generate the system clocks is stopped during the watch mode and the subactive mode. However, it is also possible to operate OSC1 during the low-power-consumption mode but not operate the clock generating circuit CPG when the flag LSON is a logic "0" or even during the watch mode by providing other flags. Since there would be no time delay in waiting for the start of the oscillation circuit OSC1 if always on, the watch mode can be switched to the active mode at high speed. The flags in the aforementioned embodiments may be constituted independently by flip-flop circuits, a bit in the control register or a given bit in the RAM may be allotted thereto.

The synchronizing circuit synchronizes system operation with the basic clock pulses CK1 or CK2 by switching the clock pulse generating circuit CPG, and generating the gate control signals that will be input to the clock pulse generating circuit CPG. The synchronizing circuit may be constituted in a variety of forms. For example, the output unit of the clock pulse generating circuit CPG may be provided with a gate circuit to control the output timing thereof. Alternatively, the flip-flop circuit constituting the clock pulse generating circuit may be forcibly reset and may then be released in synchronization with the basic clock pulse CK1 or CK2.

The foregoing description has chiefly dealt with the case where the invention accomplished by the present inventors is adapted to a single-chip microcomputer having a low-power-consumption mode. The invention, however, is in no way limited thereto, but can be widely adapted to a variety of semiconductor integrated circuit devices that supply a plurality of clock pulses having different oscillation frequencies asynchronously to internal circuits in a switched manner.

What is claimed is:

1. A semiconductor integrated circuit comprising:
   first oscillation circuit means, responsive to a first oscillation circuit control signal, for selectively producing a first clock signal having a first frequency;
   second oscillation circuit means for producing a second clock signal having a second frequency different from said first frequency;
   clock generating circuit means, operatively associated with said first and second oscillation circuit means and responsive to a clock generating circuit control signal, for selectively forming i) first internal clock signals from the first clock signal of said first oscillation circuit when the clock generating circuit control signal is in a first state and ii) second internal clock signals from the second clock signal of said second oscillation circuit when the clock generating circuit control signal is in a second state;
   data processing means, operatively associated with said clock generating circuit means receiving clock signals therefrom, for processing data according to a predetermined program in a first operating mode in which the data processing means executes the program in accordance with the first clock signal, and in a second operating mode in which the data processing means executes the program in accordance with the second clock signal; and,
   control means, operatively associated with said clock generating circuit means and said data processing means and including at least one control data register storing control data, for controlling:
   i) said clock generating circuit to form: the first internal clock signals by generating said clock generating circuit control signal in said first state when the data processing means is in said first operating mode, the second internal clock signals by generating said clock generating circuit control signal in said second state when the data processing means is in said second operating mode, and neither of the first and second internal clock signals at a period when said clock generating circuit changes to a selected one of said first or second internal clock signals from the non-selected one of said first or second clock signals; and,
   ii) said first oscillation circuit by controlling said first oscillation circuit control signal causing the first oscillation circuit to stop producing the first clock signal when the data processing means is controlled based on said second internal clock signals in said second operating mode.

2. The semiconductor integrated circuit according to claim 1, further comprising a timekeeping circuit controlled by the second clock signal of said second oscillation circuit means and which produces pulses for measuring time, wherein said data processing means includes means for executing an increment operation on time data based on said pulses for measuring time.

3. The semiconductor integrated circuit according to claim 2, wherein said executing means of said data processing means includes means for performing said increment operation based upon said second internal clock signals.

4. The semiconductor integrated circuit according to claim 3, further comprising means for stopping the first oscillation circuit means during a period of at least said increment operation.

5. The semiconductor integrated circuit according to claim 4, further comprising an internal bus means for coupling said control data register and said data processing means, wherein said data processing means includes means for writing said control data to said control data register using said internal bus means.

6. The semiconductor integrated circuit according to claim 5, wherein said clock generating circuit includes means for selectively forming a one of said first internal clock signals, said second internal clock signals, and neither, based upon the data in said control data register.

7. The semiconductor integrated circuit according to claim 6, further comprising first external terminals connected to said first oscillation circuit means for coupling with a first external oscillator, and second external terminals connected to said second oscillation circuit means for coupling with a second external oscillator.

8. The semiconductor integrated circuit according to claim 7, further comprising:
- a first frequency-dividing circuit for dividing the first frequency of the first clock signal of said first oscillation circuit means, to form a frequency-divided first clock signal;
- a second frequency-dividing circuit for dividing the second frequency of the second clock signal of said second oscillation circuit means, to form a frequency-divided second clock signal; and
- a multiplexer for selectively supplying a one of the frequency-divided first clock signal of said first frequency-dividing circuit and the frequency-divided second clock signal of said second frequency-dividing circuit to said clock generating circuit.

9. The semiconductor integrated circuit according to claim 8, wherein said data processing means includes storage means for storing the time data, micro ROM means for storing instructions that designate said increment operation, and an execution unit controlled by the micro ROM means.

10. A microcomputer comprising:
- first oscillation circuit means for selectively producing first signals which change between first and second states at a first frequency;
- second oscillation circuit means for producing second signals which change between third and fourth states at a second frequency different from said first frequency;
- clock generating circuit means, operatively associated with the first and second oscillation circuit means, for selectively forming first clock signals based on the first signals of said first oscillation circuit and second clock signals based on the second signals of said second oscillation circuit;
- data processing means for executing a predefined instruction stored in a memory based on said selectively formed first or second clock signals; and,
- control means, operatively associated with the clock generating circuit means and the data processing means and including at least one control register storing control data, for:
  i) controlling an output condition of said clock generating circuit, to form the first clock signals in a first operational mode of said microcomputer, to form the second clock signals in a second operational mode of said microcomputer, and to deactivate wherein no clock signals are formed in a third operational mode of said microcomputer; and,
  ii) controlling the first oscillation circuit to stop producing the first signals when the data processing means is controlled based on the second clock signals;
- wherein said control means controls the clock generating circuit using a deactivation control signal so that said clock generating circuit forms no clock signals during a transition period in which the clock generating circuit changes from a selected one of said first or second clock signals to the non-selected one of the first or second clock signals.

11. The microcomputer according to claim 10, further comprising a timekeeping circuit controlled based on the second signals of said second oscillation circuit means for producing pulses for measuring time, wherein said data processing means includes means for executing an increment operation upon time data based on said pulses for measuring time.

12. The microcomputer according to claim 11, wherein said executing means of said data processing means includes means for performing said increment operation based upon said second internal clock signals.

13. The microcomputer according to claim 12, further comprising means for stopping said first oscillation circuit means during a period of at least said increment operation.

14. The microcomputer according to claim 13, further comprising an internal bus means for coupling said control data register and said data processing means wherein said data processing means includes means for writing said control data to said control data register using said internal bus means.

15. The microcomputer according to claim 14, wherein said clock generating circuit means includes means for selectively forming a one of said first clock signals, said second clock signals, and neither depending upon the control data in said control data register.

16. The microcomputer according to claim 15, further comprising first external terminals coupled to said first oscillation circuit means for connection with a first external oscillator, and second external terminals coupled to said second oscillation circuit means for connection with a second external oscillator.

17. The microcomputer according to claim 16, further comprising:
- a first frequency-dividing circuit for dividing the first frequency of the first signals of said first oscillation circuit means;
- a second frequency-dividing circuit for dividing the second frequency of the second signals of said second oscillation circuit means; and
- a multiplexer for selectively supplying either one of an output of said first frequency-dividing circuit or an output of said second frequency dividing circuit, to said clock generating circuit.

18. A semiconductor integrated circuit comprising:
- a first producing means for selectively producing a first periodic oscillating signal having a first period, said first producing means being operatively connected to an external signal connection;
- a second producing signal for producing a second periodic oscillating signal having a second period, the periods of the first and second oscillating signals being not equal;
- a clock signal generating means for selectively generating clock signals from either one of the first or second oscillating signals;
- a selecting means for selecting either the first or second oscillating signal as input for the clock signal generating means;
- first control means for causing the first producing means to be non-operational for conservation of energy when said clock signal generating means generates the clock signals from the second oscillating signal;
- a deactivating means for deactivating the clock signal generating means and the selecting means, said deactivating means being operatively connected to the selecting means, and the external signal connection; and,
- a second control means for controlling the deactivating means, wherein said second control means receives the generated clock signals and outputs control signals in a predetermined relationship to the generated clock signals.

19. The semiconductor integrated circuit according to claim 18 wherein the second control means further comprises:
an instruction executing means, whereby a stop signal is transmitted to the activating means upon execution of a stop instruction.

20. The semiconductor integrated circuit according to claim 19 wherein the deactivating means further comprises:
a means for deriving a timing signal from the second oscillating signal;
a directing means for directing the selecting means, said directing means being operatively connected to the deriving means, the selecting means, and the external connection, whereby the directing means selectively directs the selecting means in a predetermined relationship to the derived timing signal and an external signal received from the external signal connection as to which oscillating signal the selecting means will select; and,
a means for activating the clock signal generating means, said activating means being operatively connected to the clock signal generating means, the controlling means, and the deriving means, whereby the actuating means selectively activates the clock signal generating means in a predetermined relationship to the stop signal transmitted from the controlling means and the derived timing signal.

21. The semiconductor integrated circuit according to claim 20 further comprising means for activating the first oscillating signal producing means based upon the external signal received over the external signal connection.

22. A single-chip microcomputer comprising:
first terminals coupled to a first oscillator;
second terminals coupled to a second oscillator;
a first oscillation circuit coupled to the first terminals for selectively producing a first clock signal which changes between first and second states at a first predetermined frequency;
a second oscillation circuit coupled to the second terminals for producing a second clock signal which changes between the first and second states at a second predetermined frequency different from the first predetermined frequency;
selecting means, coupled to the first and second oscillation circuits and responsive to a first control signal, for outputting a selected one of the first or second clock signals;
data processing means, coupled to receive internal clock signals for executing predetermined data processing in accordance with the internal clock signals, the data processing means having a first operating mode in which the data processing means executes the predetermined data processing in accordance with a first internal clock signal corresponding to the first clock signal and having a second operating mode in which the data processing means executes the predetermined data processing in accordance with a second internal clock signal corresponding to the second clock signal;
a clock pulse generator means coupled to the selecting means, for supplying the first and second internal clock signals, according to a selected one of the first or second clock signals, to the data processing means, wherein the clock pulse generator means is responsive to a second control signal when an operation mode of the data processing means is to be changed from a selected one of the first or second modes to the non-selected of the first or second modes and enters a predetermined third mode in which neither the first or second internal clock signals are supplied to the data processing means; and,
means, responsive to the second control signal, for controlling the first oscillation circuit to stop producing the first clock signal when the data processing means is in the second operating mode.

23. The single-chip microcomputer according to claim 22 further comprising:
a clock select register means, coupled to the selecting means, for providing the first control signal in accordance with clock select data stored therein; and,
a clock supply control register means, coupled to the clock pulse generator, for providing the second control signal in accordance with clock supply data stored therein.

24. The single-chip microcomputer according to claim 23 further comprising a bus coupled between the clock select register and the data processing means for transmitting data between the clock select register and the data processing means.

25. The single-chip microcomputer according to claim 23 wherein the second predetermined frequency is about 32.768 kHz and wherein the first predetermined frequency is higher than 32.768 kHz.

26. A single-chip microcomputer having a standard operating mode and a low-power consumption mode different from the standard operation mode, the single-chip microcomputer comprising:
first terminals coupled to a first oscillator;
second terminals coupled to a second oscillator;
a first oscillation circuit coupled to the first terminals and responsive to a first oscillation circuit control signal for selectively producing a first clock signal which changes between first and second states at a first predetermined frequency and which is used in the standard operation mode;
a second oscillation circuit coupled to the second terminals for producing a second clock signal which changes between the first and second states at a second predetermined frequency different from the first predetermined frequency and which is used in the low-power consumption mode;
clock pulse generating means, coupled to the first and second oscillation circuits to selectively receive a one of the first and second clock signals based on a clock pulse generating control signal, for providing internal clock signals in accordance with the selected one of the first and second clock signals and for inhibiting the internal clock signals responsive to an inhibit control signal;
control means coupled to the clock pulse generating means for:
i) selectively providing said inhibit control signal to the clock pulse generating means to bring the clock pulse generating means into a predetermined mode in which the internal clock signals provided by the clock pulse generating means are shut off;
ii) controlling the first oscillation circuit with said first oscillation circuit control signal to be non-operational and not produce the first clock signal when the single-chip microcomputer is in said low-power consumption mode; and, iii) selectively forcing the clock pulse generating means into said predetermined mode when the single-chip microcomputer is transferred from a selected one of the standard operation and low-power consumption modes to the other non-selected of the standard operating and low-power consumption modes using the inhibit control signal; and, data processing means, coupled to the clock pulse generating means, for executing a predetermined data processing in accordance with the internal clock signals received from the clock pulse generating means.

27. The single-chip microcomputer according to claim 26 wherein the second predetermined frequency is substantially 32.768 kHz and wherein the first predetermined frequency is higher than 32.768 kHz.

28. The single-chip microcomputer according to claim 26 wherein the control means includes a control register for selectively providing the inhibit control signal depending upon data stored therein.

29. The single-chip microcomputer according to claim 28 further comprising a bus coupled between the control register and the data processing means for transmitting data to the control register from the data processing means, wherein the data is written into the control register when the data processing means executes a predetermined instruction.

* * * * *